United States Patent [19]

Danko et al.

[11] 4,015,694
[45] Apr. 5, 1977

[54] BRAKE CONSTRUCTION

[75] Inventors: John D. Danko, Canton; Richard C. St. John, North Canton, both of Ohio

[73] Assignee: Aspro, Inc., Canton, Ohio

[22] Filed: Oct. 30, 1975

[21] Appl. No.: 627,250

[52] U.S. Cl. .......................... 188/106 A; 188/217; 188/331
[51] Int. Cl.² ...................................... F16D 51/22
[58] Field of Search ............ 188/78, 106 A, 106 F, 188/217, 325, 331, 364

[56] References Cited

UNITED STATES PATENTS

| 1,984,883 | 12/1934 | La Brie | 188/106 A |
| 2,176,398 | 10/1939 | Fowler | 188/78 X |
| 2,196,333 | 4/1940 | Bowen | 188/331 |
| 3,023,852 | 3/1962 | Powlas | 188/331 |

Primary Examiner—Duane A. Reger
Attorney, Agent, or Firm—Frease & Bishop

[57] ABSTRACT

A vehicle brake having a pair of brake shoes moveably mounted and arranged in end-to-end relationship on a fixed backing plate. A pair of levers is pivotally mounted on the backing plate. The levers have thrust transmitting portions which are interposed between a pair of opposed brake shoe ends and a hydraulic service brake actuator for moving the brake shoes into engagement with the brake drum. The levers also have swinging end portions which pivot inwardly in opposite directions upon outward movement of the thrust transmitting portions. The lever thrust portions have concavely curved camming surfaces which slidably engage complementary convexly curved brake shoe end surface for transmitting the hydraulic actuator force to the brake shoes. A mechanically actuated parking brake mechanism is mounted on the backing plate and is operatively connected to the lever swing end portions by a pair of links. One end of each link is operatively connected by a pin within a slotted end of an actuating handle, with the other link ends being slotted and moveably connected to the lever swinging end portions. Actuation of the handle by a parking brake actuating force pivots the lever swinging end portions inwardly through the connecting links which in turn expand the brake shoes outwardly into engagement with the drum through the resulting outward movement of the lever thrust portions.

17 Claims, 11 Drawing Figures

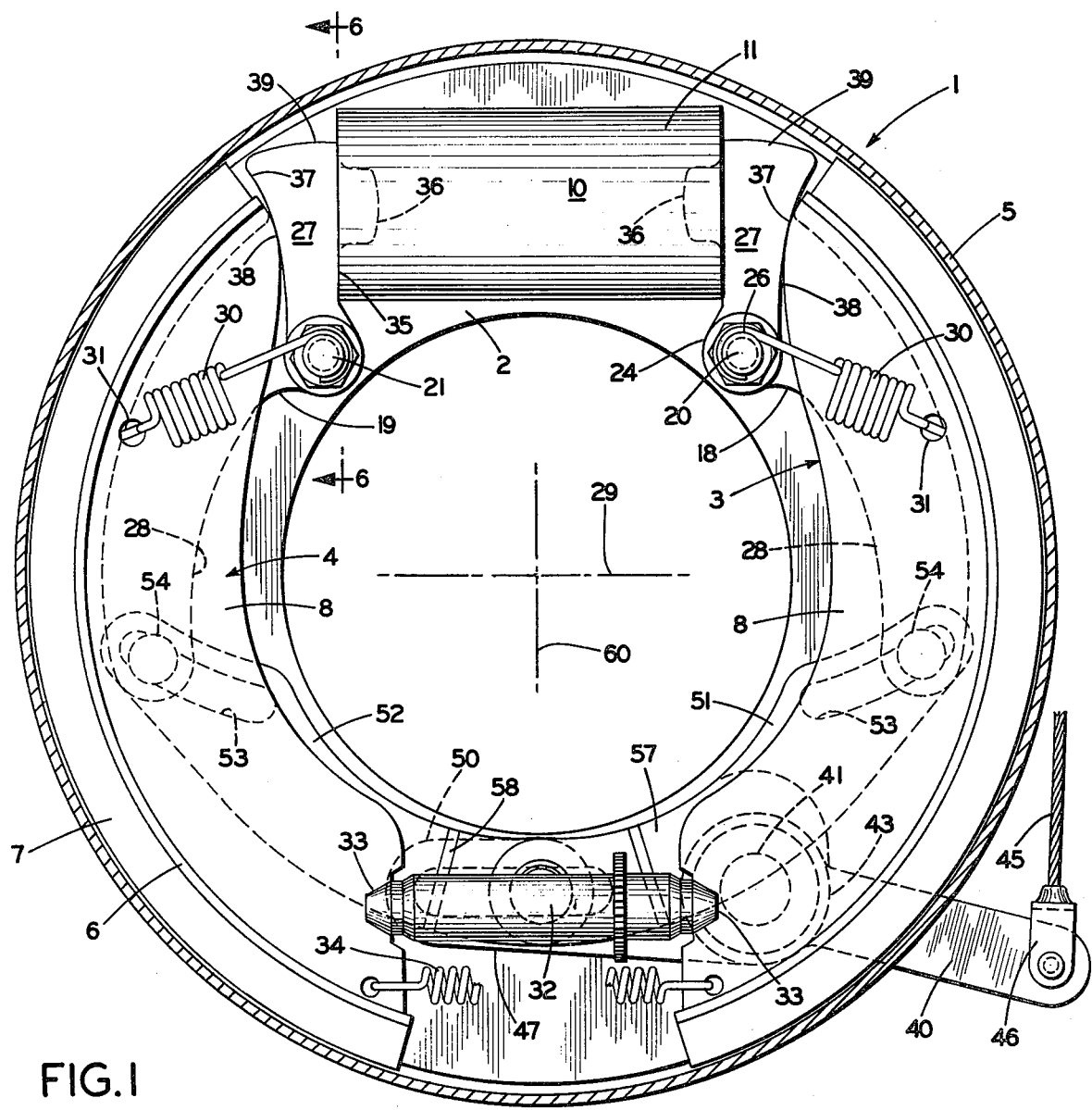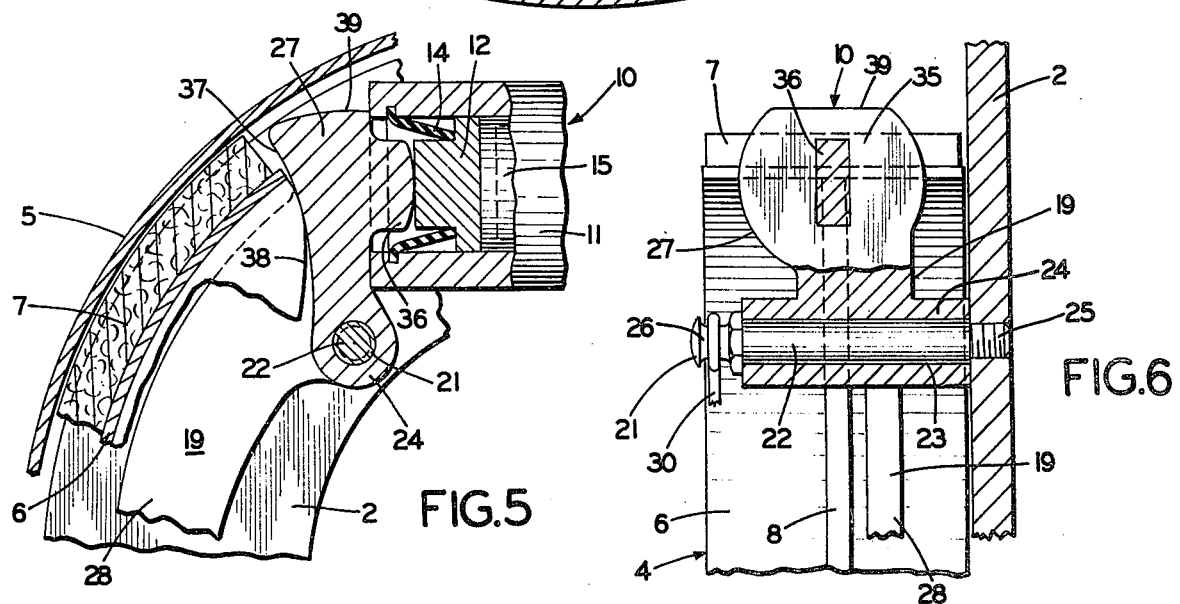

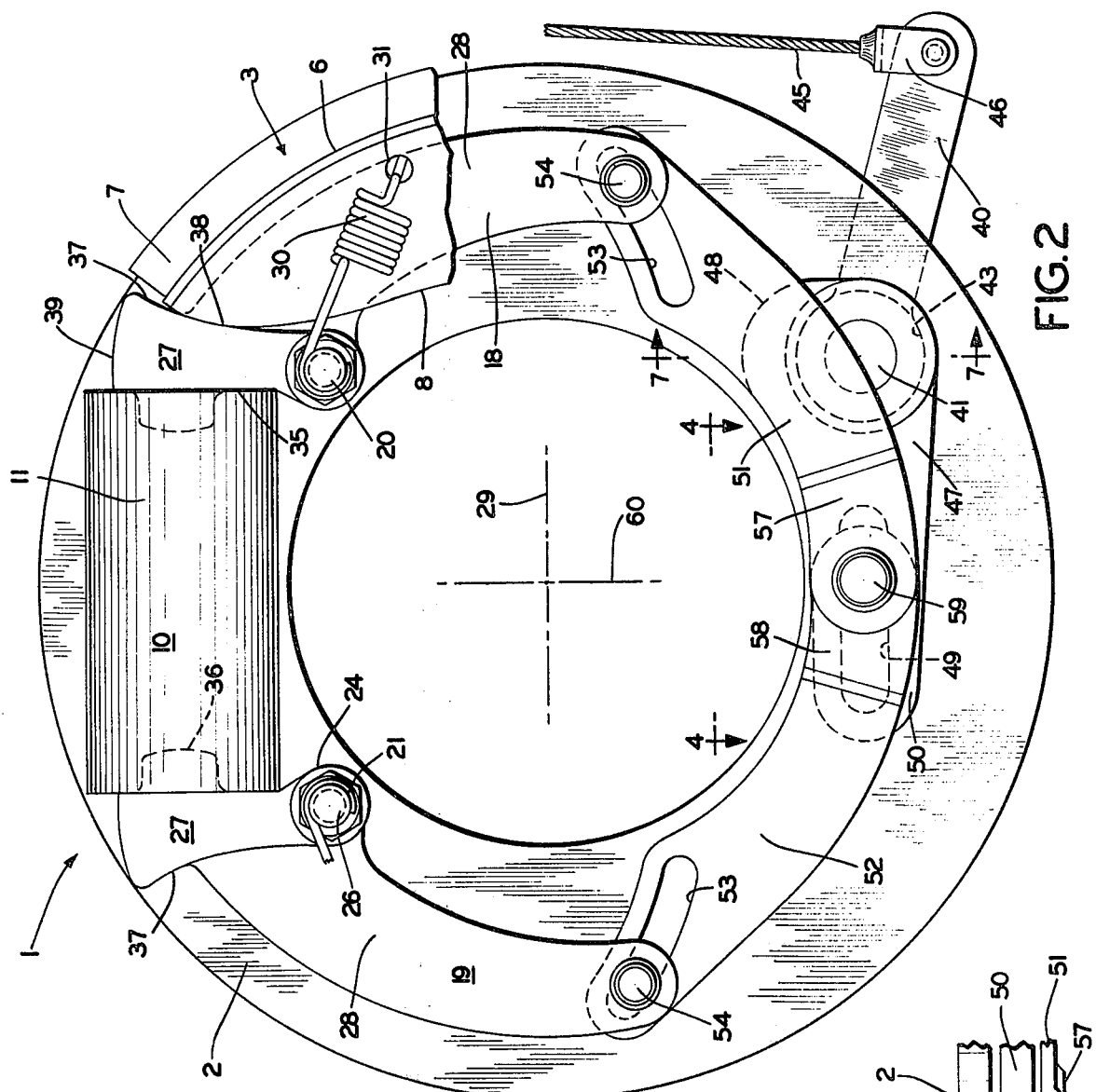
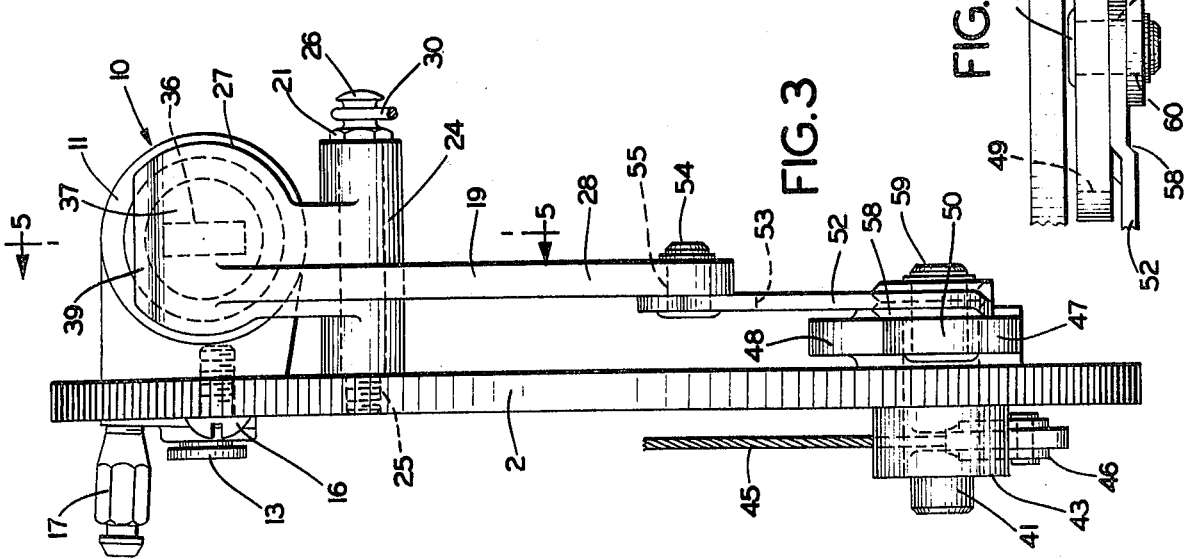

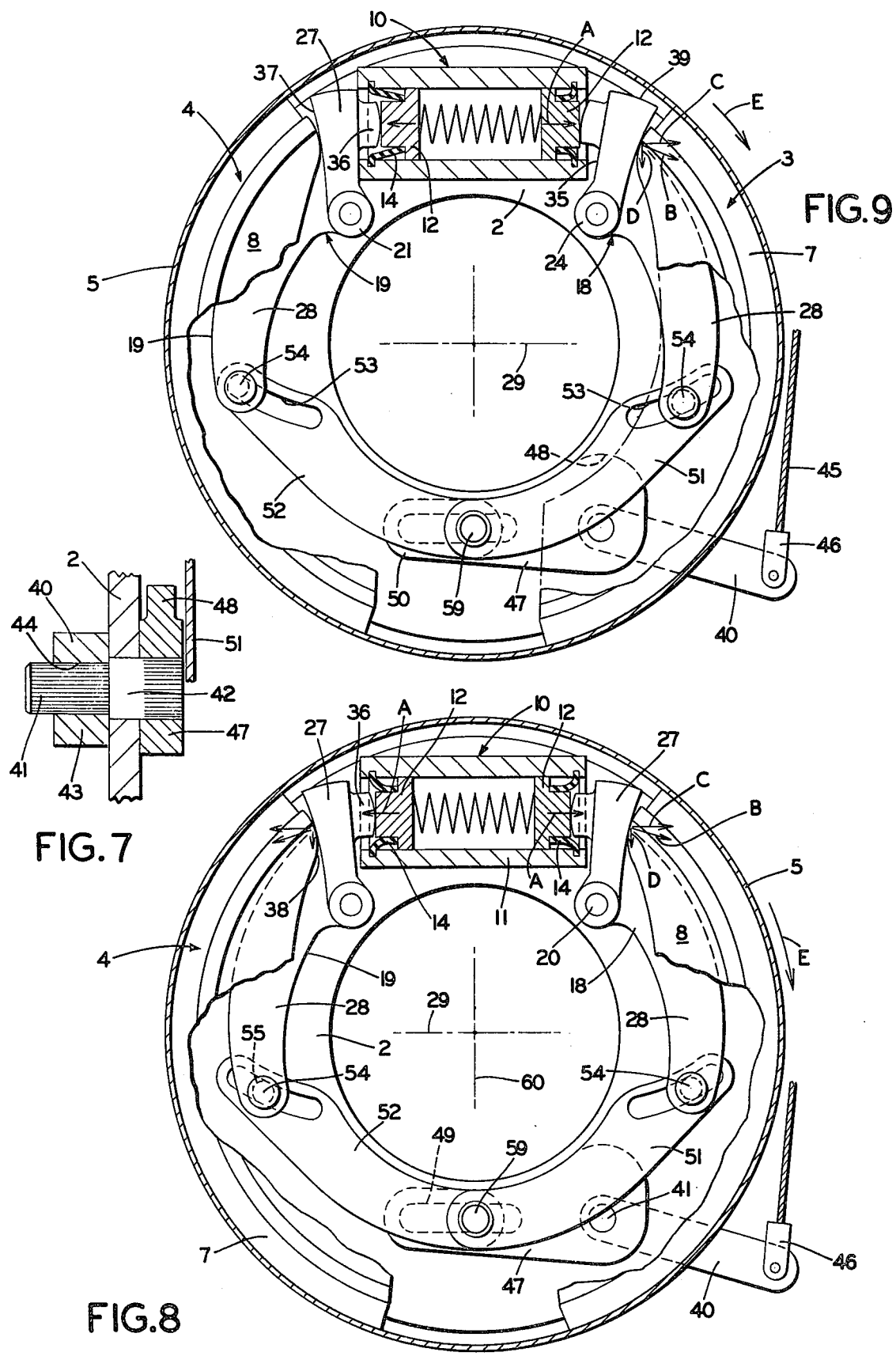

BRAKE CONSTRUCTION

BACKGROUND OF THE INVENTION

1. Field of the Invention

The invention relates to vehicle brakes and in particular to brakes having camming levers for transmitting the braking actuating force to the brake shoes. More particularly, the invention relates to a brake construction having such camming levers in combination with a hydraulic service brake actuator and a mechanical actuated parking brake mechanism both of which operatively engage the levers for expanding the brake shoes outwardly into engagement with a brake drum, and in which the parking brake mechanism is unaffected by the operation of the hydraulic service brake and vice versa.

2. Description of the Prior Art

Numerous brake constructions have been developed to increase and transmit efficiently the actuating force of a hydraulic cylinder to the brake shoes for expanding the brake shoes outwardly into braking engagement with a brake drum. Such constructions use various anchored and moveably mounted brake shoe combinations to increase the brake shoe efficiency and to provide a satifactory low-cost brake construction.

In many brake constructions the hydraulic actuating force is applied to the brake shoes by direct engagement of the fluid actuated pistons with the brake shoe ends or a component thereof. Many of these constructions use a straight hydraulic cylinder arrangement in which a pair of pistons move outwardly in opposite generally horizontal directions along the axis of the cylinder. The outward force exerted on the shoes by the pistons has a negligible vertical component. Normal braking force component is the result of this horizontal component. The addition of a small downward component of the actuating force provides significant increase in the normal force and consequently the brake torque which is proportional to the normal force.

V-shaped hydraulic cylinders such as shown in U.S. Pat. Nos. 3,322,237 and 3,482,658, apply the actuating force in a downwardly angularly direction against the brake shoe or actuating components as opposed to the horizontal direction of usual straight cylinder pistons. This angularly applied force increases the normal component of the actuating force, which increases significantly the normal force component of the braking torque which correspondingly increases the braking torque between the drum and brake shoes. Such V-shaped or angled actuating cylinders, however, are more expensive than the usual straight cylinders, resulting in an undesirable cost increase of the resulting brake in order to achieve the increased or self-energizing braking action.

One known brake construction, shown in U.S. Pat. No. 2,372,322, uses a straight cylinder, double-piston fluid actuator in which the actuating forces are applied to the ends of levers, which in turn exert a spreading force to pairs of brake shoes at their anchored abutting ends. Such a construction does not provide the sliding camming action of the improved brake construction as set forth below, nor is such a construction intended to be used in combination with slidably mounted or floating brake shoe arrangements.

It is desirable in many vehicle brake constructions to provide both a hydraulically actuated service brake mechanism and a mechanically actuated parking brake mechanism. Examples of such dual brake constructions are shown in U.S. Pat. Nos. 2,060,874, 2,127,739, 2,374,526, and 3,023,853. Preferably, such dual brake constructions use many of the brake components for expanding the brake shoes outwardly into braking engagement with the drum upon actuation of either the service or parking brake mechanisms. It also is desirable to have the remaining brake components which are used specifically for either the service or parking brake mechanisms to be unaffected upon actuation of the other braking action, thereby eliminating unnecessary wear of the components and needless mechanical movements.

No brake construction of which we are aware provides a pair of camming levers in combination with a straight cylinder dual-piston hydraulic actuator and a pair of floating brake shoes to achieve the advantages of a V-shaped cylinder, by increasing the vertical or normal component of the piston's horizontal actuating force through a sliding camming action between the levers and brake shoes which results in a significant increase in braking torque. Likewise, no known camming lever actuated brake construction is provided with a mechanical parking brake mechanism operatively connected to the levers by links having a floating or freely moveable connection point.

SUMMARY OF THE INVENTION

Objectives of the invention include providing a vehicle brake construction of the type having a pair of floating brake shoes and a straight cylinder, double-piston hydraulic service brake actuator, with a pair of pivotally mounted levers interposed between one pair of opposed ends of the brake shoes and the hydraulic actuator for increasing the normal component of the piston actuating force to significantly increase the braking torque; providing such a brake construction in which a mechanically actuated parking brake mechanism is operatively connected with swinging end portions of the levers by slotted links for expanding the brake shoes outwardly upon application of a mechanically applied parking brake force; providing such a brake construction in which the levers have thrust transmitting portions which slidably engage the opposite ends of the brake shoes to provide a camming action therebetween for expanding the brake shoes outwardly and to increase the normal component of the hydraulic braking force upon application of the braking force, and in which the lever swinging end portions move inwardly in opposite directions without affecting the mechanical parking brake mechanism; providing such a brake construction using a straight cylinder hydraulic actuator to increase the self-energizing braking effect between the brake shoes and drum which, heretofore, required a more expensive V-shaped cylinder actuator; and providing such a brake construction which is of a simple and rugged construction, which eliminates difficulties, heretofore, encountered, achieves the enumerated objectives simply, efficiently and effectively, and solves problems and satisfies existing needs.

These objectives and advantages are obtained by the improved brake construction, the general nature of which may be stated as including a backing plate adapted to be mounted on a stationary part of a vehicle axle; a pair of brake shoes slidably mounted in end-to-end relationship on the backing plate and expandable towards and against a brake drum, said brake shoes having camming surfaces on a pair of opposed ends; a straight cylinder hydraulic brake actuator mounted on the backing plate and located between said pair of opposed ends of the brake shoes; the actuator having a pair of pistons outwardly moveable along a common axis of the actuator in opposite directions; strut means interconnecting the other pair of opposed brake shoe ends; a pair of lever means pivotally mounted on the backing plate, each of the lever means having a thrust transmitting portion and a swinging end portion, the thrust transmitting portions being interposed between and respectively engageable with a respective one of the hydraulic actuator pistons and a respective one of opposed ends of the brake shoes; the lever means thrust transmitting portions each having a camming surface engageable with a respective one of the brake shoe camming surfaces, whereby, operation of the hydraulic actuator moves the pistons outwardly rotating the thrust transmitting portions outwardly in opposite directions with respect to each other and into sliding camming engagement with their respective brake shoe end camming surfaces to expand the brake shoes outwardly toward a brake drum; mechanically actuated parking brake means operatively connected to the lever means swinging end portions; the parking brake means including handle means pivotally mounted on the backing plate, arm means pivotally mounted on the backing plate and operatively connected to the handle means for rotation with the handle means; link means extending between and operatively connected to the lever means swinging end portions and the arm means; and the handle means being rotated when acted upon by a parking brake actuating force to rotate the arm means and to draw the lever means swinging end portions inwardly by associated movement of the connecting links to move the brake shoes outwardly into engagement with the brake drum through the camming action of the interposed thrust transmitting portions of the lever means.

BRIEF DESCRIPTION OF THE DRAWINGS

A preferred embodiment of the invention — illustrative of the best mode in which applicants have contemplated applying the principles — is set forth in the following description and shown in the drawings, and is particularly and distinctly pointed out and set forth in the appended claims.

FIG. 1 is a front elevational view of the improved brake construction mounted within a brake drum shown in section;

FIG. 2 is an elevational view similar to FIG. 1 with the brake shoes broken away to show the brake shoe operating levers and the link operated parking brake mechanism;

FIG. 3 is a left-hand end view of the brake components of FIG. 2;

FIG. 4 is a fragmentary view of the parking brake handle and control link connection looking in the direction of Arrows 4—4, FIG. 2;

FIG. 5 is a fragmentary sectional view with portions broken away, taken on line 5—5, FIG. 3;

FIG. 6 is a fragmentary sectional view, with portions broken away, taken on line 6—6, FIG. 1;

FIG. 7 is a fragmentary sectional view taken on line 7—7, FIG. 2;

FIG. 8 is a diagrammatic elevational view similar to FIGS. 1 and 2, with portions broken away, showing the brake components when the improved brake construction is initially hydraulically actuated and the brake shoes are in expanded position;

FIG. 9 is a view similar to FIG. 8 showing the relative positions of the brake components after the brake drum has exerted 9 exerted a force on the brake shoes of FIG. 8;

Similar numerals refer to similar parts throughout the drawings.

DESCRIPTION OF THE PREFERRED EMBODIMENT

Figure 11:
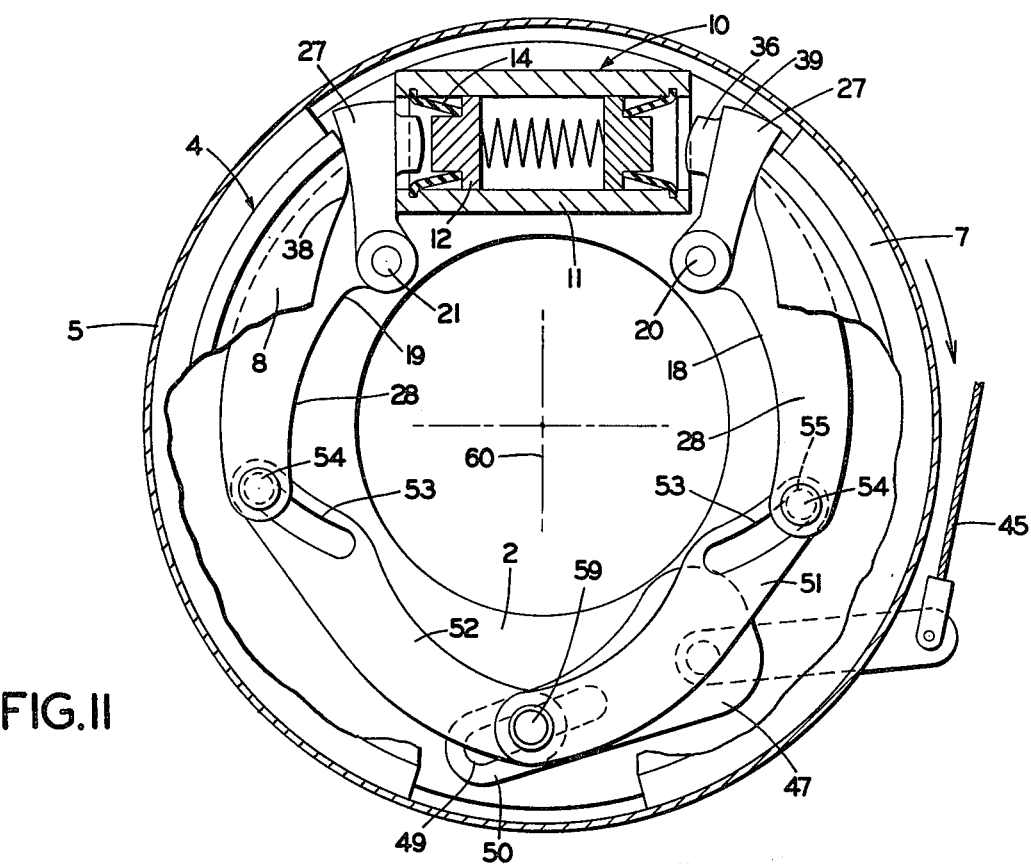
FIG. 11 is a view similar to FIG. 10, showing the relative positions of the brake components after engagement of the brake shoes with the brake drum.

The improved brake construction is indicated generally at 1 (FIGS. 1 and 2). Brake 1 includes a usual backing plate 2, which is adapted to be mounted on a fixed part of a vehicle axle. A pair of brake shoes 3 and 4 are slidably mounted on backing plate 2 in end-to-end relationship for engagement with a rotatable brake drum 5. Brake shoes 3 and 4 each have a rim 6 with a lining 7 of frictional material mounted thereon and a transverse web 8 attached at its outer edge to rim 6.

A hydraulically operated brake actuator 10 is mounted on backing plate 2 and is located between the upper pair of adjacent brake shoe ends. Actuator 10 is of a usual construction having a straight cylinder body 11 with a pair of pistons 12 (FIG. 5) mounted therein for movement in opposite directions along the axis of the cylinder upon application of an actuating fluid through inlet-outlet port 13 (FIG. 3). Rubber sealing boots 14 are mounted on the ends of cylinder body 11 and engageable with pistons 12, with a pair of internal sealing cups 15 being engaged with the inner ends of pistons 12. Cylinder body 11 is mounted on backing plate 2 by a pair of screws 16 spaced adjacent a cylinder bleeder 17.

In accordance with the invention, a pair of levers 18 and 19 is pivotally mounted by pins 20 and 21, respectively, on backing plate 2 between the ends of actuator 10 and brake shoes 3 and 4. Pins 20 and 21 each have a smooth shank portion 22, (FIG. 6) which extends through a bore 23 of a boss 24 formed on levers 18 and 19 to rotatably mount levers 18 and 19 on backing plate 2. Pins 20 and 21 have threaded ends 25 threadably engaged with backing plate 2, with grooved locking heads 26 formed on the opposite pin ends.

Levers 18 and 19 are similar, each including a thrust transmitting camming portion 27, which extends upwardly between the upper brake shoe end and actuator 10, and an arcuate-shaped swinging end portion 28. Swinging end portions 28 are located between a respective brake shoe and backing plate 2, and extend downwardly along backing plate 2 terminating below the horizontal center line 29 of the backing plate as illustrated in FIGS. 1 and 2.

Return springs 30 are connected at one end to shoes 3 and 4 through holes 31 formed therein, and are connected at their other ends to pivot pin heads 26 for returning the brake shoes to their released or unactuated position of FIG. 1 upon release of a service brake actuating pedal by an operator.

A usual manually adjustable strut 32 extends between and separates the lower or other pair of opposed brake shoe ends, with brake shoe webs 8 being received within slotted ends 33 of strut 32. A spring 34 maintains these lower brake shoe ends in engagement with strut 32.

Inner surfaces 35 of lever thrust transmitting portions 27 are formed with inwardly projecting studs 36 (FIGS. 5 and 6) adapted to engage cylinder pistons 12. Inner surfaces 35 are generally flat with outer surfaces 37 of lever thrust portions 27 being concavely curved and complementary to convexly curved surfaces 38 formed on the upper pair of opposed ends of webs 8 of shoes 3 and 4. Lever mounting bosses 24 are formed on the lower areas of thrust portions 27 opposite a generally flat top surface 39 (FIG. 6).

Lever swinging end portions 28 are formed integrally with thrust portions 27 and extend in outwardly downwardly curved relationship with respect thereto (FIG. 2). Lever portions 28 have radii of curvature generally similar to the radii of curvature of backing plate 2, brake shoe rims 6 and drum 5. Lever portions 28 also have a reduced thickness (FIGS. 3 and 6) with respect to thickness of thrust portions 27.

In further accordance with the invention, a mechanically actuated parking brake mechanism is mounted on backing plate 2 and is operatively connected to lever swinging ends 28 and brake shoes 3 and 4. An actuating handle 40 is pivotally mounted on the underside surface of backing plate 2 in the vicinity of the lower pair of opposed brakeshoe ends (FIGS. 2, 3, and 7) by a splined pin 41. Pin 41 has a smooth central portion 42 for rotatably mounting pin 41 with respect to backing plate 2. Handle 40 has an enlarged circular boss 43 formed with a bore 44 into which splined pin 41 extends, with a parking brake actuating cable 45 being connected to the swinging end of handle 40 by a pivotally mounted clevis 46.

A control arm 47 is pivotally mounted on the top surface of backing plate 2 on a second splined end of pin 41 for rotation in the same direction with actuating handle 40. Arm 47 is provided with a thickened, somewhat elongated mounting boss 48 (FIGS. 2 and 3) with a slot 49 being formed in and extending along the extended or swinging end 50 of control arm 47.

A pair of links 51 and 52 operatively connect and extend between arm 47 and the extended ends of lever swinging end portions 28 (FIG. 2). Links 51 and 52 are similar, each being formed with a slot 53 through which pins 54 extend for moveably mounting links 51 and 52 on the ends of lever end portions 28. Pins 54 extend through complementary holes 55 formed in the lever ends (FIG. 3). The other ends of links 51 and 52 are formed with stepped end portions 57 and 58, respectively (FIG. 4), which are maintained in overlapping relationship with respect to each other by a pin 59. Pin 59 extends through aligned holes 60 and 61 formed in link stepped ends 57 and 58 and through lever slot 49.

The operation of the improved brake construction 1 is set forth below. Brake shoes 3 and 4 are shown in their unactuated retracted position in FIGS. 1 and 2 with brake lining 7 being spaced from brake drum 5. Depression of a vehicle service brake pedal by an operator actuates hydraulic actuator 10 which moves the double acting pistons 12 outwardly in opposite directions, as indicated by Arrows A, FIG. 8. This outward movement of the pistons pivots levers 18 and 19 about pins 20 and 21 in opposite directions, lever 18 in a clockwise direction and lever 19 in a counterclockwise direction. Lever portions 27 transmit the axial thrust forces of the pistons to brake shoes 3 and 4 through the sliding camming action of concave camming lever surfaces 37 along convex camming edges or surfaces 38 of brake shoe webs 8. These outward axial forces A of pistons 12 are transmitted to the brake shoes in a direction from the area of contact toward the center of curvature of the area of contact of brake shoe surfaces 38, indicated as Arrows B. Applied forces B each have a horizontal force component C and a vertical force component D. The vertical force component D requires a significant increase in the vertical component of the normal force that acts upon lining 7 at the equivalent point of contact with brake drum 5, thereby, resulting in a proportional increase in the braking torque between shoes 3–4 and drum 5.

Assume brake drum 5 has the tendency to rotate in the clockwise direction indicated by Arrow E, FIG. 8, which illustrates the relative position of the service brake components after the outward expansion of the brake shoes and prior to the rotational force of the brake drum acting upon the brake shoes and components. Linings 7 of brake shoes 3 and 4 expand outwardly due to the rotation of lever thrust portions 27 and the movement of the lower brake shoe ends about their respective contact points with strut 32 until engaging drum 5. The rotational force of the drum upon contacting the brake linings will exert a clockwise directional force on the shoes causing shoes 3 and 4 through strut 32 to slide in a clockwise direction with respect to backing plate 2, and assume the final actuated position of FIG. 9. This clockwise movement of the brake shoes will pivot left-hand end lever thrust portion 27 to its retracted position by the clockwise rotational force exerted thereon. The movement of lever portion 27 will be stopped by contacting actuator cylinder body 11 which is anchored with respect to backing plate 2. The right-hand end thrust portion 27 will be pivoted further outwardly to its fully extended position by piston 12 upon the clockwise rotational movement of shoes 3 and 4.

Lever swinging end portions 28 initially move inwardly in opposite directions upon the outward movement of thrust portions 27. One of the features of the improved brake construction is that this inward movement of the lever swinging end portions 28 has no effect on the parking brake actuating mechanism since connecting pins 54 move inwardly in arcuate paths along arcuate shaped link slots 53.

Springs 30 return brake shoes 3 and 4 to their retracted positions upon release of the vehicle service brake by an operator. Levers 18 and 19, likewise, pivotally swing back to their unactuated positions due to the return sliding camming action of surfaces 37 and 38 of lever portions 27 and brake shoes 3–4, respectively, again without affecting parking brake links 51 and 52.

Brake shoes 3 and 4 will assume opposite positions than the positions shown in FIG. 9 when brake drum 5 exerts a counterclockwise rotational force on the shoes.

Figure 10:
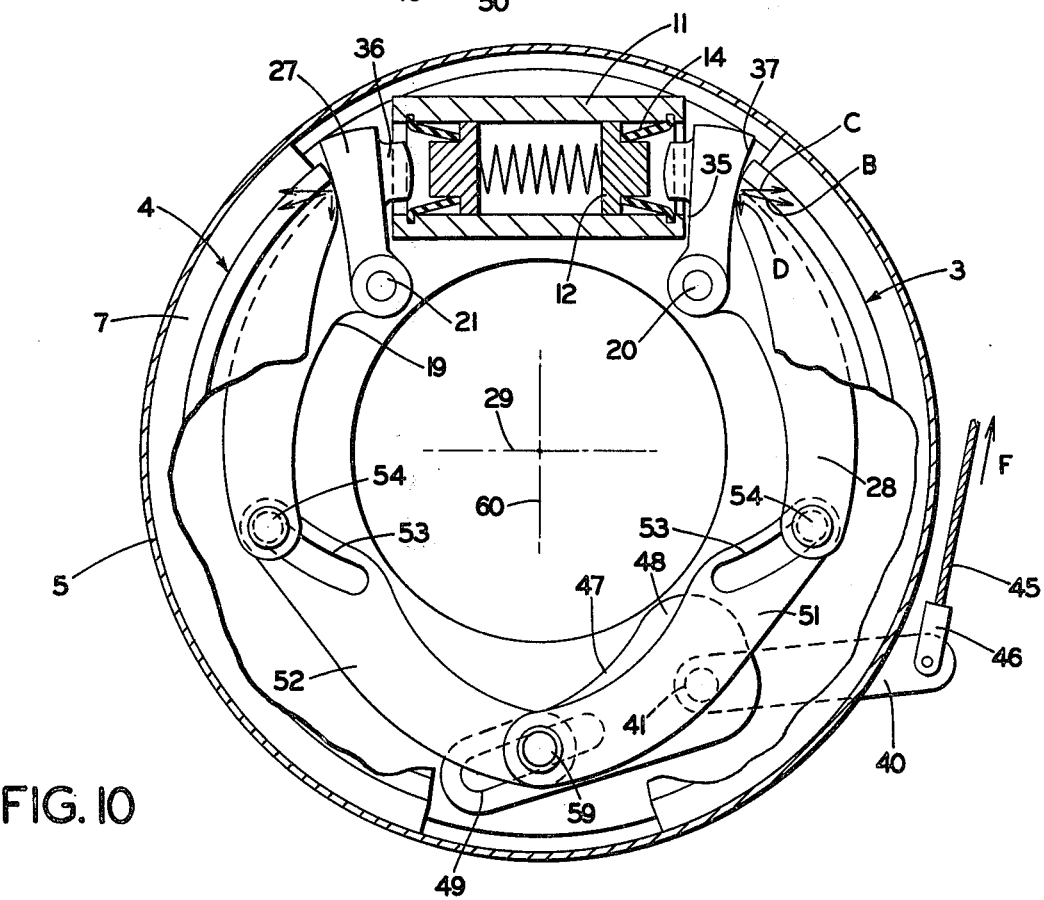
FIG. 10 is a diagrammatic elevational view similar to FIGS. 8 and 9, showing the brake components when the parking brake mechanism is initially actuated with the brake shoes in expanded position.

FIG. 10 illustrates the relative position of the brake components upon actuation of the vehicle parking brake mechanism prior to brake drum 5 exerting a clockwise rotational force thereon. Handle 40 pivots in a counterclockwise direction about pin 41 upon a mechanical braking force F being applied to handle 40 through upward movement of cable 45. Control arm 47, in turn, is rotated counterclockwise by the movement of handle 40 through pin 41, moving pin 59 along slot 49 and in a vertically downwardly direction with respect to the vertical axis 60 of the brake construction. This inital downward vertical movement of pin 59 pivots lever swinging end portions 28 inwardly in opposite directions due to the engagement of pins 54 with the upper ends of link slots 53. The inward movement of lever end portions 54 pivots thrust portions 27 in opposite outwardly directions into sliding camming engagement with brake shoe end surfaces 38 expanding the shoes outwardly with lining 7 contacting drum 5.

The clockwise rotational force exerted by drum 5 on the expanding brake shoes slidably rotates shoes 3–4 in a clockwise direction from the position of FIG. 10 to the position of FIG. 11. Leading brake shoe 4 pivots left-hand lever portion 27 from its outward position of FIG. 10 into butting engagement with cylinder body 11 which functions as an anchor or stop for the brake shoes. Right-hand lever portion 27, consequently, will pivot further outward with respect to actuator 10 as brake shoe 3 moves in the clockwise direction. The clockwise rotation of lever 19 drags link 52 toward the left-hand side of the brake assembly as viewed in FIGS. 10 and 11 through the engagement of pin 54 at the rear of link slot 53. The movement of link 52, in turn, moves link connecting pin 59 along slot 49 of arm 47 which, in turn, draws link 51 toward the left or clockwise, continuing to pivot lever 18 in a clockwise direction through the engagement of pin 54 of lever 18 with the end of slot 53 of link 51.

Release of actuating force F on cable 45 returns the brake components from their actuated positions of FIG. 11 to the retracted positions of FIGS. 1 and 2 due to the tension exerted by springs 30 on brake shoes 3 and 4.

Brake construction 1 has the advantage of increasing the braking torque by increasing the vertical component of the actuating force component applied to the brake shoes by the hydraulic actuator pistons through the sliding camming action of interposed lever portions 27, permitting a relatively inexpensive straight dual-piston actuator cylinder to be used instead of the heretofore, more expensive angled or V-shaped cylinders. Brake construction 1 has the further advantage of the incorporation of a mechanically actuated parking brake mechanism which utilized most of the components of the hydraulic braking mechanism, thereby, eliminating excess parts and in which the additional components required for the parking brake mechanism are unaffected upon actuation of the hydraulic service brake components. Another advantage of the brake construction is that is it a rugged, simple mechanism constructed of easily produced mechanical components.

Accordingly, the improved brake construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitation are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the brake construction is constructed and used, the characteristics of the construction, and the advantageous, new and useful results obtained; the new and useful structures, devices, elements, arrangements, parts, and combinations, are set forth in the appended claims.

We claim:
1. Brake construction including
   a. a backing plate adapted to be mounted on a stationary part of a vehicle axle;
   b. a pair of brake shoes slidably mounted in end-to-end relationship on the backing plate and expandable towards and against a brake drum, said brake shoes having camming surfaces on a pair of opposed ends;
   c. a hydraulic brake actuator mounted on the backing plate and located between said pair of opposed ends of the brake shoes, said actuator having an axis and a pair of pistons outwardly movable along said axis;
   d. strut means interconnecting the other pair of opposed brake shoe ends;
   e. a pair of lever means pivotally mounted on the backing plate, each of said lever means having a thrust transmitting portion and a swinging end portion integral with the thrust transmitting portion, said thrust transmitting portion being interposed between and respectively engageable with a respective one of the actuator pistons and a respective one of said pair of opposed ends of the brake shoes with the swinging end portions extending toward said other pair of opposed brake shoe ends and adapted to move inwardly in opposite directions with respect to each other when the thrust transmitting portions pivot outwardly;
   f. mechanically actuated parking brake means operatively connected to the lever means swinging end portions; and
   g. the lever means thrust portions each having a camming surface engageable with a respective one of the brake shoe camming surfaces, whereby, operation of the hydraulic actuator moves the pistons outwardly rotating the thrust transmitting portions outwardly in opposite directions with respect to each other and into sliding camming engagement with their respective brake shoe ends to expand said brake shoes outwardly toward a brake drum.

2. The brake construction defined in claim 1 in which the parking brake means includes handle means pivotally mounted on the backing plate; in which arm means is pivotally mounted on the backing plate and operatively connected to the handle means for rotation with said handle means; in which a pair of links extends between and is operatively connected to the lever means swinging end portions and the arm means; and in which the handle means rotates when acted upon by a parking brake actuating force to rotate the arm means and to draw the lever means swinging end portions inwardly by associated movement of the connecting links to move the brake shoes outwardly into engagement with the brake drum through the camming action of the interposed thrust transmitting portions of the lever means.

3. The brake construction defined in claim 2 in which the arm means is formed with a slot; and in which pin means extends through the arm means slot and operatively connects the links to the arm means.

4. The brake construction defined in claim 2 in which the links are formed with slots; in which pin means are mounted on the lever means swinging end portions; and in which said lever means pin means extends through the link slots to operatively connect the lever means swinging end portions to the links.

5. The construction defined in claim 4 in which pivotal movement of the handle and arm means exerts a force on the connecting links which provides inward forces on the lever means swinging end portions to exert an outward force on the brake shoes through the lever means thrust transmitting portions.

6. The brake construction defined in claim 1 in which spring means extend between the lever means and respective brake shoes to return said brake shoes to retracted position upon removal of the hydraulic braking force.

7. The construction defined in claim 1 in which the brake shoe ends camming surfaces are convexly shaped; and in which the lever means thrust transmitting portions camming surfaces are concavely shaped and are complementary to said brake shoe camming surfaces.

8. Parking brake construction including
 a. a backing plate adapted to be mounted on a stationary part of a vehicle axle;
 b. a pair of brake shoes slidably mounted in end-to-end relationship on the backing plate and expandable towards and against a brake drum, said brake shoes having camming surfaces on a pair of opposed ends;
 c. a pair of lever means pivotally mounted on the backing plate, each of said lever means having a thrust transmitting portion and a swinging end portion, each of said thrust transmitting portions having a camming surface operatively engageable with a respective one of the brake shoe camming surfaces;
 d. handle means pivotally mounted on the backing plate, said handle means having an end adapted to be acted upon by a parking brake actuating force;
 e. arm means pivotally mounted on the backing plate and operatively connected to the handle means for rotation with said handle means; and
 f. link means extending between and operatively connected to the lever means swinging end portions and the arm means; whereby, application of a parking brake force to the handle means rotates the arm means and exerts a force on the link means to draw the lever means swinging end portions inwardly, thereby, rotating the thrust transmitting portions outwardly in opposite directions bringing the camming surfaces of the thrust transmitting portions into sliding camming engagement with the camming surfaces of the respective brake shoe ends to expand said brake shoes outwardly toward a brake drum.

9. The brake construction defined in claim 8 in which the link means each have first and second ends; in which the first ends are formed with slots to provide moveable connections with the lever means swinging end portions; and in which the arm means is formed with a slot to provide a moveable connection with the second ends of the link means.

10. The brake construction defined in claim 9 in which pin means connect the second ends of the link means in pivotal overlapping relationship with respect to each other; and in which the pin means is engaged within the arm means slot to form the moveable connection between the link means and arm means.

11. The brake construction defined in claim 8 in which the camming surfaces of the thrust transmitting portions each have a concave configuration; and in which the camming surfaces of the brake shoes each have a convex configuration.

12. The brake construction defined in claim 9 in which the link means slots have an arcuate configuration; and in which said slots have a radius of curvature equal to the radius of the lever means swinging end portion at the point of connection with said link means.

13. Brake construction including:
 a. a backing plate adapted to be mounted on a stationary part of a vehicle axle;
 b. a pair of brake shoes slidably mounted in end-to-end relationship on the backing plate and expandable towards and against a brake drum, said brake shoes having camming surfaces on a pair of opposed ends;
 c. a hydraulic brake actuator mounted on the backing plate and located between said pair of opposed ends of the brake shoes, said actuator having an axis and a pair of hydraulically actuated piston means outwardly movable along said axis;
 d. strut means interconnecting the other pair of opposed brake shoe ends;
 e. a pair of lever means, each having a thrust transmitting portion interposed between a respective one of the actuator piston means and a respective one of the camming surfaces of said pair of opposed ends of the brake shoes, said thrust transmitting portions each having a camming surface adapted to slidably engage a respective one of the brake shoe camming surfaces;
 f. pin means pivotally mounting the lever means on the backing plate for swinging movement of the thrust transmitting portions in predetermined paths; and
 g. the lever means thrust transmitting portions pivoting outwardly in opposite directions with respect to each other and into sliding camming engagement with their respective brake shoe end camming surfaces immediately upon operation of the hydraulic actuator to transmit the hydraulic actuating force of the piston means to the brake shoes through the interposed thrust transmitting portions to expand said brake shoes outwardly toward a brake drum, with said thrust transmitting portions being in compression between their respective brake shoe camming surfaces and hydraulic brake actuator.

14. The brake construction defined in claim 13 in which the lever means include swinging end portions integral with the thrust transmitting portions and extending toward said other pair of opposed brake shoe ends; in which the swinging end portions move inwardly in opposite directions with respect to each other when the thrust transmitting portions pivot outwardly into engagement with the brake shoe ends; and in which mechanically actuated parking brake means is operatively connected to the lever means swinging end portions.

15. The brake construction defined in claim 14 in which the parking brake means includes handle means pivotally mounted on the backing plate; in which arm means is pivotally mounted on the backing plate and operatively connected to the handle means for rotation with said handle means; in which link means extends between and is operatively connected to the lever means swinging end portions and the arm means; and in which the handle means is adapted to rotate when acted upon by a parking brake actuating force to rotate the arm means and to draw the lever means swinging end portions inwardly by associated movement of the connecting link means to move the brake shoes outwardly into engagement with the brake drum through the camming action of the interposed thrust transmitting portions of the lever means.

16. The brake construction defined in claim 15 in which the arm means is formed with slot means; and in which pin means extends through the arm means slot means and operatively connects the link means to the arm means.

17. The construction defined in claim 13 in which the brake shoe ends camming surfaces are convexly shaped; and in which the lever means thrust transmitting portions camming surfaces are concavely shaped and are complementary to said brake shoe camming surfaces.

* * * * *

UNITED STATES PATENT AND TRADEMARK OFFICE
CERTIFICATE OF CORRECTION

PATENT NO. : 4,015,694
DATED : April 5, 1977
INVENTOR(S) : John D. Danko and Richard C. St. John It is certified that error appears in the above-identified patent and that said Letters Patent are hereby corrected as shown below:

Column 1, line 26, change "satifactory" to --satisfactory--; and

Column 4, line 5, delete "exerted 9" after the word "has", and add the word --rotational-- after the word "a".

Signed and Sealed this

Twenty-first Day of June 1977

[SEAL]

Attest:

RUTH C. MASON
*Attesting Officer*

C. MARSHALL DANN
*Commissioner of Patents and Trademarks*